United States Patent
Kikuchi

(10) Patent No.: US 10,029,200 B2
(45) Date of Patent: Jul. 24, 2018

(54) PLUGGED HONEYCOMB STRUCTURE

(71) Applicant: NGK Insulators, Ltd., Nagoya (JP)

(72) Inventor: Yoshio Kikuchi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 540 days.

(21) Appl. No.: 14/628,560

(22) Filed: Feb. 23, 2015

(65) Prior Publication Data

US 2015/0258485 A1    Sep. 17, 2015

(30) Foreign Application Priority Data

Mar. 14, 2014  (JP) .................................. 2014-052425

(51) Int. Cl.
*B01D 46/24* (2006.01)
*F01N 3/022* (2006.01)
(Continued)

(52) U.S. Cl.
CPC ....... *B01D 46/2429* (2013.01); *B01D 46/244* (2013.01); *B01D 53/94* (2013.01);
(Continued)

(58) Field of Classification Search
CPC .. B01D 46/2429; B01D 53/94; B01D 46/244; B01D 2046/2496; B01D 2258/01;
(Continued)

(56) References Cited

U.S. PATENT DOCUMENTS 5,079,064 A * 1/1992 Forsythe .................. B01J 21/14
428/107
5,124,304 A * 6/1992 Blanchard ............ B01D 53/945
423/213.5
(Continued)

FOREIGN PATENT DOCUMENTS

EP  0 455 451 A1  11/1991
EP  1 964 823 A1  9/2008
(Continued)

OTHER PUBLICATIONS

Yalamac, Emre; "Sintering and microstructural investigation of gammaealpha alumina powders", Mar. 26, 2014, Engineering Science and Technology, an International Journal, 17 (2014) 2-7 https://www.sciencedirect.com/science/article/pii/S2215098614000020 last accessed Jan. 26, 2018.*
(Continued)

*Primary Examiner* — Amber R Orlando
*Assistant Examiner* — Britanny Precht
(74) *Attorney, Agent, or Firm* — Burr & Brown, PLLC

(57) ABSTRACT

There is disclosed a plugged honeycomb structure. A plugged honeycomb structure includes a pillar-shaped honeycomb structure body having porous partition walls defining a plurality of cells which become through channels for a fluid and extend from a first end face to a second end face, and plugging portions disposed in open ends of predetermined cells in the first end face and open ends of residual cells in the second end face, and the partition walls are constituted of a porous body including $\alpha\text{-}Al_2O_3$ as a main phase and further including cordierite and $Y_2Si_2O_7$.

12 Claims, 4 Drawing Sheets

(51) Int. Cl.
*B01D 53/94* (2006.01)
*C04B 38/00* (2006.01)
*C04B 35/117* (2006.01)
*B01J 23/10* (2006.01)
*B01J 35/04* (2006.01)
*C04B 111/00* (2006.01)

(52) U.S. Cl.
CPC ........ *C04B 35/117* (2013.01); *C04B 38/0006* (2013.01); *F01N 3/0222* (2013.01); *B01D 2046/2433* (2013.01); *B01D 2046/2437* (2013.01); *B01D 2046/2496* (2013.01); *B01D 2258/01* (2013.01); *B01J 23/10* (2013.01); *B01J 35/04* (2013.01); *C04B 2111/0081* (2013.01); *C04B 2111/00793* (2013.01); *C04B 2201/30* (2013.01); *C04B 2235/3217* (2013.01); *C04B 2235/3225* (2013.01); *C04B 2235/349* (2013.01); *C04B 2235/3427* (2013.01); *C04B 2235/3481* (2013.01); *C04B 2235/5436* (2013.01); *C04B 2235/5445* (2013.01); *C04B 2235/76* (2013.01); *C04B 2235/77* (2013.01); *C04B 2235/80* (2013.01); *C04B 2235/96* (2013.01); *C04B 2235/9607* (2013.01)

(58) Field of Classification Search
CPC .... B01D 2046/2433; B01D 2046/2437; F01N 3/0222; C04B 38/0006; C04B 35/117; C04B 2235/5436; C04B 2201/30; C04B 2235/3217; C04B 2235/3225; C04B 2235/3481; C04B 2235/349; C04B 2111/00793; C04B 2235/5445; C04B 2235/77; C04B 2235/80; C04B 2235/96; C04B 2235/9607; C04B 2111/0081; C04B 2235/3427; B01J 23/10; B01J 35/04
See application file for complete search history.

(56) References Cited

U.S. PATENT DOCUMENTS

| | | | | |
|---|---|---|---|---|
| 5,168,092 | A | 12/1992 | Forsythe | |
| 5,370,920 | A | 12/1994 | Forsythe et al. | |
| 6,667,012 | B1* | 12/2003 | Anand | B01D 53/945 422/177 |
| 7,250,385 | B1* | 7/2007 | Ohno | B01D 53/945 502/178 |
| 8,530,364 | B2* | 9/2013 | Grote | C04B 35/62665 501/104 |
| 9,809,500 | B2* | 11/2017 | Fourcade | C04B 35/481 |
| 9,816,020 | B2* | 11/2017 | Alary | C09K 3/1409 |
| 2002/0042339 | A1* | 4/2002 | Beall | C04B 35/10 501/128 |
| 2004/0020846 | A1* | 2/2004 | Ogunwumi | B01D 39/2093 210/510.1 |
| 2004/0023180 | A1* | 2/2004 | Kasai | C04B 35/10 431/215 |
| 2005/0214504 | A1* | 9/2005 | Yoshida | B01D 39/2079 428/116 |
| 2005/0235621 | A1* | 10/2005 | Kunieda | B01D 46/0001 55/523 |
| 2005/0266992 | A1 | 12/2005 | Ohno et al. | |
| 2007/0126160 | A1* | 6/2007 | Takahashi | B01D 39/2068 264/628 |
| 2008/0248238 | A1 | 10/2008 | Tomita et al. | |
| 2009/0220733 | A1* | 9/2009 | Backhaus-Ricoult | C04B 35/195 428/116 |
| 2010/0229813 | A1* | 9/2010 | Ogata | C04B 35/111 123/146.5 R |
| 2010/0300053 | A1* | 12/2010 | Alary | C04B 35/185 55/523 |
| 2010/0310819 | A1 | 12/2010 | Suwabe et al. | |
| 2011/0130276 | A1* | 6/2011 | Backhaus-Ricoult | B01D 46/2429 502/410 |
| 2013/0145735 | A1 | 6/2013 | Motoki et al. | |
| 2013/0214463 | A1 | 8/2013 | Suwabe et al. | |
| 2015/0147561 | A1 | 5/2015 | Watanabe et al. | |

FOREIGN PATENT DOCUMENTS

| | | |
|---|---|---|
| JP | 2004-510676 A1 | 4/2004 |
| JP | 2005-349378 A | 12/2005 |
| JP | 2008-136981 A1 | 6/2008 |
| JP | 2010-208901 A | 9/2010 |
| WO | 02/28803 A1 | 4/2002 |
| WO | 2009/063997 A1 | 5/2009 |
| WO | 2013/047908 A1 | 4/2013 |
| WO | 2013/187182 A1 | 12/2013 |

OTHER PUBLICATIONS

Extended European Search Report (Application No. 15157953.9) dated Jun. 25, 2015.
Japanese Office Action (with English translation), Japanese Application No. 2014-052425, dated Jul. 18, 2017 (11 pages).
European Office Action, European Application No. 15157953.9, dated Jan. 26, 2018 (5 pages).

* cited by examiner

PLUGGED HONEYCOMB STRUCTURE

The present application is an application based on JP2014-52425 filed with Japan Patent Office on Mar. 14, 2014, the entire contents of which are incorporated herein by reference.

BACKGROUND OF THE INVENTION

Field of the Invention

The present invention relates to a plugged honeycomb structure, and more particularly, it relates to a plugged honeycomb structure which can inhibit a temperature rise during use at high temperatures and is excellent in thermal shock resistance.

Background Art

An exhaust gas discharged from an internal combustion engine such as a diesel engine, each type of combustion device or the like includes a large amount of particulate matter (hereinafter also referred to as "PM") mainly composed of soot. When this PM is discharged as it is into the air atmosphere, an environmental pollution is caused. Therefore, in an exhaust system for the exhaust gas, a particulate filter to trap the PM is mounted. An example of the particulate filter is a diesel particulate filter (DPF) for use in purification of the exhaust gas discharged from the diesel engine.

In such a DPF, there is used, for example, a honeycomb structure having porous partition walls defining a plurality of cells which become through channels for the exhaust gas. In this honeycomb structure, plugging portions to plug open ends of cells are disposed in the open ends of the predetermined cells in an end face on an outflow side of the fluid and the open ends of the residual cells in an end face on an inflow side of the fluid, and hence this honeycomb structure is utilized as a plugged honeycomb structure. Hereinafter, a particulate filter such as the DPF in which the plugged honeycomb structure is used will generically be referred to as a "honeycomb filter" sometimes.

As the honeycomb structure for use in the DPF or the like, for example, a ceramic honeycomb structure has been suggested in which partition walls are constituted of main crystals of aluminum titanate in which MgO and $SiO_2$ are solid-dissolved (e.g., see Patent Document 1). Furthermore, as the honeycomb structure, for example, there has been suggested a ceramic structure which has a first phase including β-eucryptite and a second phase including a positive component having higher thermal expansion than a component of thermal expansion of the first phase and which is characterized by microcracks (e.g., see Patent Document 2). In addition, as the honeycomb structure, for example, another honeycomb structure has been suggested in which a heat capacity C represented by a product of specific heat c (kJ/kg·K) and a specific gravity ρ (kg/m$^3$) is from 400.0 to 2000.0 (kJ/m$^3$·K) and a thermal conductivity κ is from 1.0 to 30.0 (W/m·K) (e.g., see Patent Document 3).

In a honeycomb filter such as the DPF, a pressure loss gradually increases due to the PM deposited in the filter with an elapse of time, and hence the PM deposited in the honeycomb filter is periodically burnt and removed to regenerate the filter sometimes. For example, as a method of regenerating the DPF, a regenerating method is known in which a temperature of the exhaust gas discharged from the engine is raised to heat the DPF by using the exhaust gas at the high temperature. An example of a method of raising the temperature of the exhaust gas is a method in which by post jetting to temporarily excessively jet a fuel in a latter half of an explosion stroke or in an exhaust stroke, the excessive fuel is burnt to raise the temperature of the exhaust gas.

[Patent Document 1] WO 2009/63997
[Patent Document 2] JP-A-2004-510676
[Patent Document 3] JP-A-2008-136981

SUMMARY OF THE INVENTION

In recent years, an improvement of a fuel efficiency of a car has been demanded from the viewpoints of global environment protection and resource saving. As to the abovementioned regeneration of the DPF by the post jetting, a fuel which is not concerned with an engine output is consumed during the regeneration of the DPF, and hence the more frequently the regeneration takes place, the worse the fuel efficiency of the car becomes. Therefore, for the purpose of improving the fuel efficiency of a diesel engine for the car, decrease of the number of times to regenerate the abovementioned DPF (i.e., a plugged honeycomb structure) is investigated. That is, the consumption of the fuel required for the regeneration is inhibited as much as the decrease of the number of the times to regenerate the DPF, so that the improvement of the fuel efficiency of the engine can be achieved.

However, when the number of the times to regenerate the DPF is decreased, an interval until the regeneration is performed (i.e., a regeneration period) lengthens, and hence during the regeneration, a larger amount of soot than before is deposited on the surfaces of partition walls. Furthermore, when the amount of the soot to be deposited on the surfaces of the partition walls increases, a temperature rise due to burning of the soot enlarges, so that thermal shock is noticeably generated in the DPF. In consequence, when the number of the times to regenerate the DPF is decreased, there is increasingly the possibility that the DPF is damaged due to the thermal shock.

To prevent the abovementioned damages due to the thermal shock accompanying the decrease of the number of the times to regenerate the DPF, there is contrived a method of heightening a heat capacity of the partition walls of the plugged honeycomb structure for use in the DPF. For example, to heighten the heat capacity of the partition walls, there is a method of lowering a porosity of the partition walls. However, when the porosity of the partition walls is lowered, another problem occurs that a pressure loss of the DPF disadvantageously increases.

As another method of heightening the heat capacity of the partition walls, a method is contrived in which a material having a higher heat capacity than a material for use in the partition walls of the conventional plugged honeycomb structure is used as a material constituting the partition walls. However, any heretofore known material disclosed as the material of the partition walls of the plugged honeycomb structure does not have such a sufficiently high heat capacity, and hence it is not possible to inhibit the damages due to the thermal shock accompanying the decrease of the number of the times to regenerate the DPF. In consequence, there is demanded a development of a plugged honeycomb structure constituted of a new material usable in partition walls of the plugged honeycomb structure and having a high heat capacity so that it is possible to effectively inhibit the damages due to the thermal shock accompanying the decrease of the number of times to regenerate the DPF.

Additionally, for example, in honeycomb structures described in Patent Documents 1 and 2, aluminum titanate or β-eucryptite is used as a material of partition walls, but these materials have a large anisotropy of thermal expansion due to a crystal orientation. Therefore, in the honeycomb structures described in Patent Documents 1 and 2, a lot of microcracks are present in the partition walls, which causes a problem that it is difficult to have a sufficient mechanical strength. For example, when a lot of microcracks are present in the partition walls, it is considered that the plugged honeycomb structure has a low initial strength and additionally, the microcracks extend due to a repeatedly generated heat stress to deteriorate a thermal shock resistance of the plugged honeycomb structure.

The present invention has been developed in view of the abovementioned problems, and an object thereof is to provide a plugged honeycomb structure which can inhibit a temperature rise during use at high temperatures and is excellent in thermal shock resistance. In particular, an object of the present invention is to provide a plugged honeycomb structure which inhibits the temperature rise and has a high thermal shock resistance and additionally has an excellent mechanical strength.

To achieve the abovementioned objects, according to the present invention, there is provided a plugged honeycomb structure as follows.

According to a first aspect of the present invention, a plugged honeycomb structure including a pillar-shaped honeycomb structure body having porous partition walls defining a plurality of cells which become through channels for a fluid and extend from a first end face to a second end face is provided, and plugging portions disposed in open ends of the predetermined cells in the first end face and open ends of the residual cells in the second end face, wherein the partition walls are constituted of a porous body including $\alpha\text{-}Al_2O_3$ as a main phase and further including cordierite and $Y_2Si_2O_7$.

According to a second aspect of the present invention, the plugged honeycomb structure according to the above first aspect is provided, wherein a mass ratio of $\alpha\text{-}Al_2O_3$ to 100 mass % of a material constituting the porous body is from 60 to 80 mass %.

According to a third aspect of the present invention, the plugged honeycomb structure according to the above first or second aspects is provided, wherein a mass ratio of cordierite to 100 mass % of the material constituting the porous body is from 20 to 40 mass %.

According to a fourth aspect of the present invention, the plugged honeycomb structure according to any one of the above first to third aspects is provided, wherein a mass ratio of $Y_2Si_2O_7$ to 100 mass % of the material constituting the porous body is from 0.1 to 5.0 mass %.

According to a fifth aspect of the present invention, the plugged honeycomb structure according to any one of the above first to fourth aspects is provided, wherein a heat capacity of the material constituting the porous body at 600° C. is from 4.00 to 4.40 J/K/cm$^3$.

According to a sixth aspect of the present invention, the plugged honeycomb structure according to any one of the above first to fifth aspects is provided, wherein an average thermal expansion coefficient of the porous body at 40 to 800° C. is from 3.0 to 6.0 ppm/K.

According to a seventh aspect of the present invention, the plugged honeycomb structure according to any one of the above first to sixth aspects is provided, wherein the porous body satisfies a relation of the following equation (1):

$$C - 0.007 \times \alpha^2 \geq 3.95 \quad (1),$$

in which C is a heat capacity (J/K/cm$^3$) of the material constituting the porous body at 600° C. and $\alpha$ is an average thermal expansion coefficient (ppm/K) of the porous body at 40 to 800° C.

According to an eighth aspect of the present invention, the plugged honeycomb structure according to any one of the above first to seventh aspects is provided, wherein a porosity of the porous body is from 20 to 50%.

According to a ninth aspect of the present invention, the plugged honeycomb structure according to any one of the above first to eighth aspects is provided, wherein an average pore diameter of the porous body is from 5 to 20 μm.

According to a tenth aspect of the present invention, the plugged honeycomb structure according to any one of the above first to ninth aspects is provided, wherein the honeycomb structure body is a segmented structure which has a plurality of pillar-shaped honeycomb segments having the partition walls and in which the plurality of honeycomb segments are bonded in a state where the honeycomb segments are disposed adjacent to one another so that side surfaces of the honeycomb segments face one another.

According to an eleventh aspect of the present invention, the plugged honeycomb structure according to any one of the above first to tenth aspects is provided, wherein an exhaust gas purifying catalyst is loaded onto at least one of each surface of the partition walls of the honeycomb structure body and each pore of the partition walls.

In a plugged honeycomb structure of the present invention, partition walls of a honeycomb structure body are constituted of a porous body including $\alpha\text{-}Al_2O_3$ as a main phase and further including cordierite and $Y_2Si_2O_7$. A material of the partition walls for use in the plugged honeycomb structure of the present invention has a higher heat capacity per unit volume of a material constituting the porous body as compared with a partition wall material for use in a heretofore known plugged honeycomb structure. In the plugged honeycomb structure of the present invention, the heat capacity per unit volume of the material constituting the porous body is high, and hence it is possible to produce a remarkable effect that the plugged honeycomb structure can inhibit a temperature rise during use at high temperatures and is excellent in thermal shock resistance. Furthermore, the material constituting the porous body is constituted of a material in which anisotropy of thermal expansion due to a crystal orientation is small, and hence it is possible to produce a remarkable effect that the plugged honeycomb structure has less microcracks and is excellent in mechanical strength. Therefore, when the plugged honeycomb structure of the present invention is used as a DPF, a temperature rise during regeneration of the DPF can be inhibited and, for example, even when the number of times to regenerate the DPF is decreased, damages due to thermal shock are not easily generated.

DESCRIPTION OF THE PREFERRED EMBODIMENTS

Figure 1:
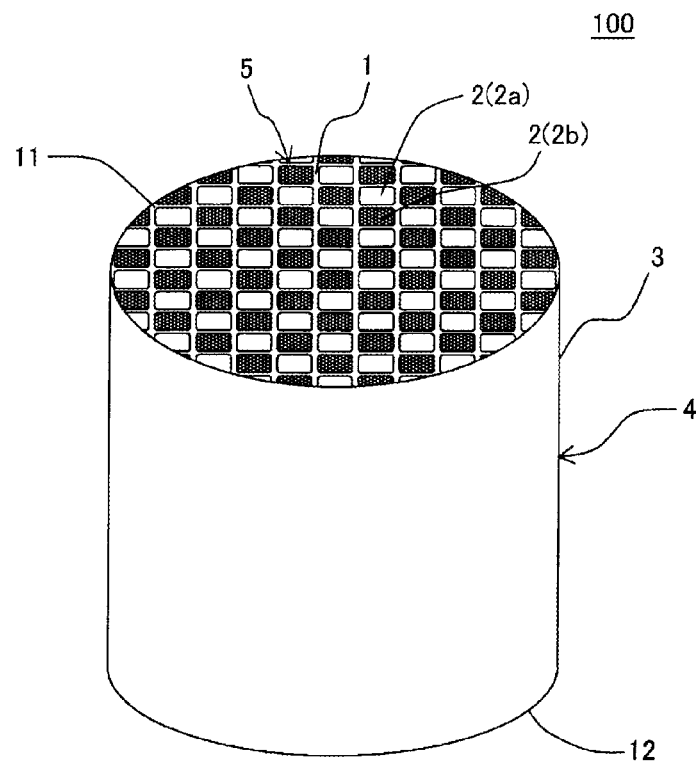
FIG. 1 is a schematic perspective view of one embodiment of a plugged honeycomb structure of the present invention seen from an inflow end face side.

Next, a mode for carrying out the present invention will be described in detail with reference to the drawings. It should be understood that the present invention is not limited to the following embodiments and that changes, improvements and the like of design are suitably added on the basis of ordinary knowledge of a person skilled in the art without departing from the gist of the present invention.

One embodiment of a plugged honeycomb structure of the present invention is a plugged honeycomb structure 100 including a pillar-shaped honeycomb structure body 4 and plugging portions 5 disposed in open ends of cells 2 as shown in FIG. 1 to FIG. 5. The honeycomb structure body 4 is a pillar-shaped body having porous partition walls 1 defining the plurality of cells 2 which become through channels for a fluid and extend from a first end face 11 to a second end face 12. The plugging portion 5 is disposed in one of the open ends of each of the plurality of cells 2 to plug the open end of the cell 2. In FIG. 1 to FIG. 5, the plugging portions 5 are disposed in the open ends of predetermined cells 2b (hereinafter referred to simply as the "cells 2b") in the first end face 11 and the open ends of the residual cells 2a (hereinafter referred to simply as the "cells 2a") in the second end face 12. The plugged honeycomb structure 100 having such a constitution is usable as a particulate filter to purify an exhaust gas discharged from an internal combustion engine or each type of combustion device. The plugged honeycomb structure 100 shown in FIG. 1 to FIG. 5 further has a circumferential wall 3 positioned at an outermost circumference of the honeycomb structure body 4.

Figure 2:
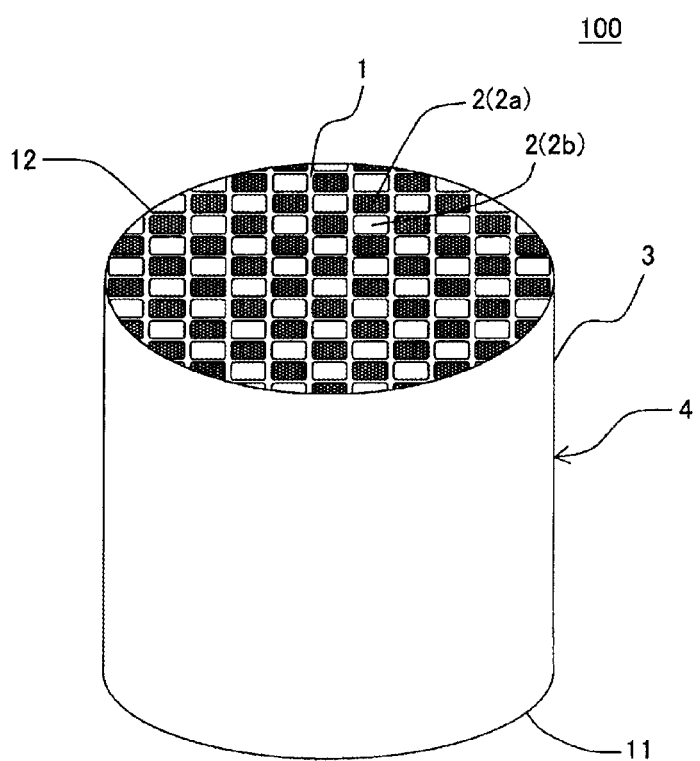
FIG. 2 is a schematic perspective view of the plugged honeycomb structure shown in FIG. 1 and seen from an outflow end face side.
Figure 3:
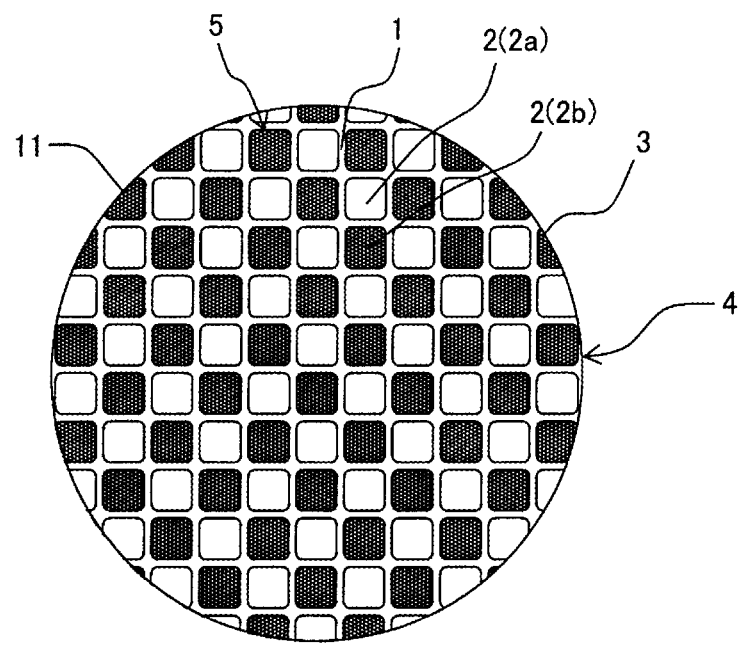
FIG. 3 is a schematic plan view of the plugged honeycomb structure shown in FIG. 1 and seen from the inflow end face side.
Figure 4:
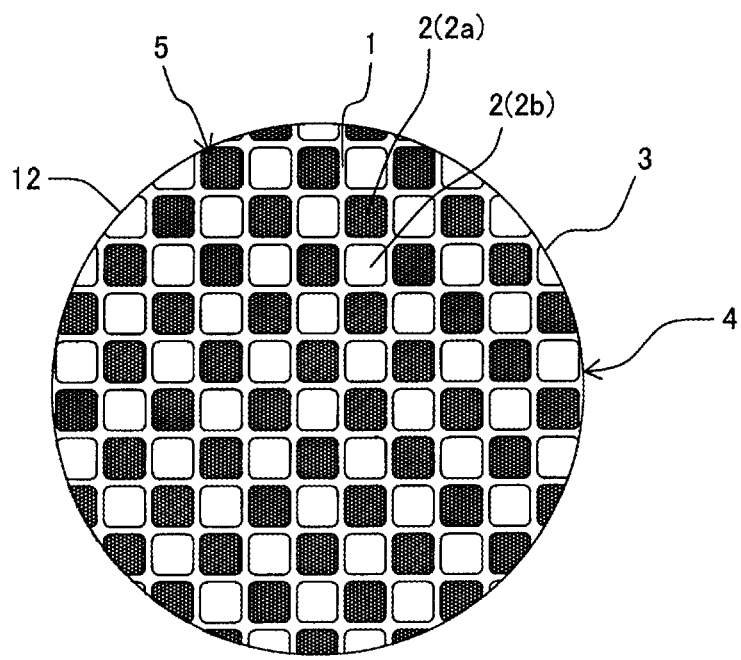
FIG. 4 is a schematic plan view of the plugged honeycomb structure shown in FIG. 1 and seen from the outflow end face side.
Figure 5:
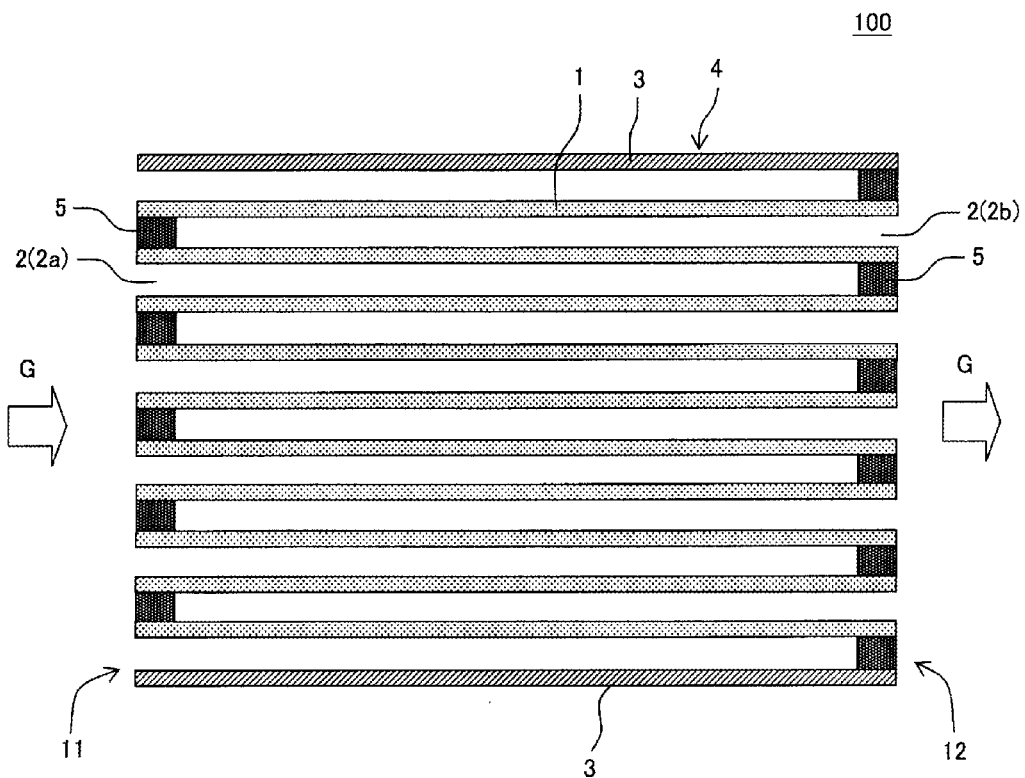
FIG. 5 is a schematic sectional view showing a cross section of the plugged honeycomb structure shown in FIG. 1 which is parallel to a cell extending direction.

Here, FIG. 1 is a schematic perspective view of one embodiment of the plugged honeycomb structure of the present invention seen from an inflow end face side. FIG. 2 is a schematic perspective view of the plugged honeycomb structure shown in FIG. 1 and seen from an outflow end face side. FIG. 3 is a schematic plan view of the plugged honeycomb structure shown in FIG. 1 and seen from the inflow end face side. FIG. 4 is a schematic plan view of the plugged honeycomb structure shown in FIG. 1 and seen from the outflow end face side. FIG. 5 is a schematic sectional view showing a cross section of the plugged honeycomb structure shown in FIG. 1 which is parallel to a cell extending direction. In FIG. 5, a reference symbol G shows the fluid (e.g., the exhaust gas) passing through the cells, and the fluid moves in a direction of arrows denoted with the reference symbol G.

In the plugged honeycomb structure 100, the partition walls 1 are constituted of a porous body including $\alpha\text{-}Al_2O_3$ as a main phase and further including cordierite and $Y_2Si_2O_7$. Such a porous body has a higher heat capacity per unit volume of a material constituting the porous body as compared with a partition wall material for use in a heretofore known plugged honeycomb structure. In the plugged honeycomb structure 100 of the present embodiment, the heat capacity per unit volume of the material constituting the porous body is high, and hence there is produced a remarkable effect that the plugged honeycomb structure can inhibit a temperature rise during the use at high temperatures and is excellent in thermal shock resistance. Furthermore, this material constituting the porous body is constituted of a material in which anisotropy of thermal expansion due to a crystal orientation is small, and hence it is possible to produce a remarkable effect that the plugged honeycomb structure has less microcracks and is excellent in mechanical strength. Therefore, when the plugged honeycomb structure 100 of the present embodiment is used as a DPF, it is possible to inhibit a temperature rise during regeneration of the DPF and, for example, even when the number of times to regenerate the DPF is decreased, damages due to thermal shock are not easily generated.

Figure 6:
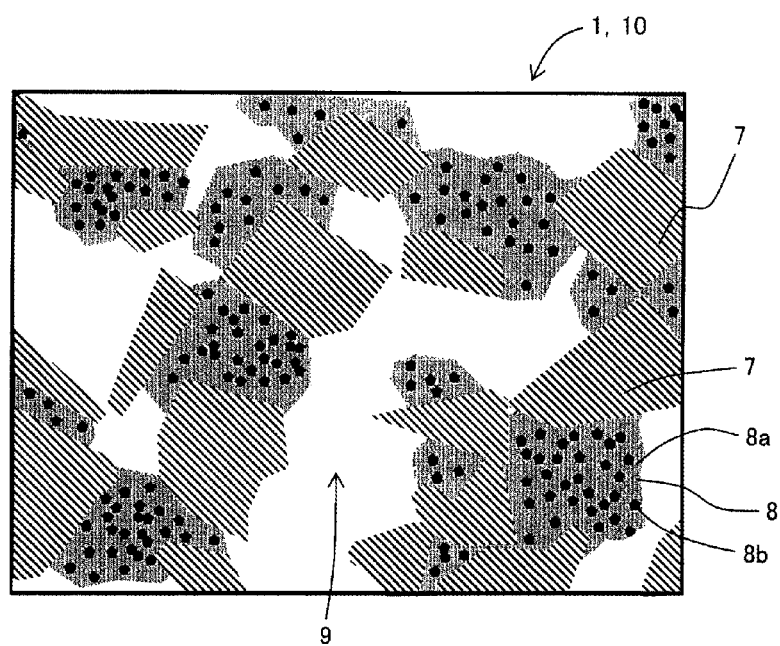
FIG. 6 is an enlarged schematic view schematically showing a porous body constituting partition walls.

In the plugged honeycomb structure 100, as shown in FIG. 6, the partition walls 1 may be constituted of a porous body 10 having aggregates 7 and a bonding material 8 to bond the aggregates 7 to one another in a state where pores 9 are formed among the aggregates 7. Furthermore, in the porous body 10, the aggregates 7 include $\alpha\text{-}Al_2O_3$ and the bonding material 8 includes cordierite and $Y_2Si_2O_7$. That is, in the porous body 10 having the aggregates 7 and the bonding material 8 as shown in FIG. 6, the aggregates 7 may be constituted of $\alpha\text{-}Al_2O_3$ included as the main phase in the porous body 10, and the bonding material 8 may be constituted of cordierite and $Y_2Si_2O_7$ further included in the porous body 10. In FIG. 6, a reference numeral 8a is "cordierite" included in the bonding material 8, and a reference numeral 8b is "$Y_2Si_2O_7$" included in the bonding material 8. According to such a constitution, $Y_2Si_2O_7$ serves as a sintering aid of cordierite, and hence it is possible to produce an effect that strength of the material constituting the porous body improves. Here, FIG. 6 is an enlarged schematic view schematically showing the porous body constituting the partition walls. It is to be noted that the porous body 10 having the aggregates 7 and the bonding material 8 as described above is one configuration of the porous body constituting the partition walls of the plugged honeycomb structure of the present embodiment. Therefore, the porous body constituting the partition walls of the plugged honeycomb structure of the present embodiment may be, for example, a porous body in which the aggregates are not clearly distinguished from the bonding material.

The "main phase" in the porous body constituting the partition walls 1 is a substance having a mass ratio of 40 mass % or more. On the other hand, a substance which has a mass ratio smaller than 20 mass %, does not correspond to the abovementioned main phase and is identified by X-ray diffraction method is referred to a "sub phase" sometimes. It is to be noted that the "main phase" in the porous body is not limited to one type. Furthermore, when two types of substances satisfying the above conditions are present, both the two types of substances belong to the "main phase". In the present description, the "substance" means a substance which chemically has a constant composition and cannot be divided into two types or more of substances by a physical operation.

In the present description, a case where "$\alpha\text{-}Al_2O_3$", "$MgAl_2O_4$" or "$Y_2Si_2O_7$" is described also includes a case where components other than the components described in the above chemical formula may be solid-dissolved therein. Examples of the other components solid-dissolved therein include Fe, Mg and Si.

A mass ratio of α-Al$_2$O$_3$ to 100 mass % of the material constituting the porous body is preferably from 60 to 80 mass %, further preferably from 65 to 80 mass %, and especially preferably from 65 to 75 mass %. When the mass ratio of α-Al$_2$O$_3$ is small, the heat capacity per unit volume of the material constituting the porous body does not sufficiently improve sometimes. On the other hand, when the mass ratio of α-Al$_2$O$_3$ is large, an average thermal expansion coefficient of the porous body at 40 to 800° C. enlarges sometimes. In the plugged honeycomb structure of the present embodiment, a value of "F" shown in the following equation (2) is preferably 3.95 or more. Furthermore, when the heat capacity is low or the average thermal expansion coefficient enlarges, this value of "F" disadvantageously becomes smaller than 3.95.

$$F=C-0.007\times\alpha^2 \quad (2),$$

in which C is the heat capacity (J/K/cm$^3$) of the material constituting the porous body at 600° C. and α is the average thermal expansion coefficient (ppm/K) of the porous body at 40 to 800° C.

A mass ratio of cordierite to 100 mass % of the material constituting the porous body is preferably from 20 to 40 mass %, further preferably from 20 to 35 mass %, and especially preferably from 25 to 35 mass %. When the mass ratio of cordierite is small, the material constituting the porous body has a low strength sometimes. When the mass ratio of cordierite is large, the heat capacity per unit volume of the material constituting the porous body becomes smaller sometimes.

A mass ratio of Y$_2$Si$_2$O$_7$ to 100 mass % of the material constituting the porous body is preferably from 0.1 to 5.0 mass % and further preferably from 0.5 to 2.0 mass %. When the mass ratio of Y$_2$Si$_2$O$_7$ is small, the material constituting the porous body has low strength sometimes. When the mass ratio of Y$_2$Si$_2$O$_7$ is large, the heat capacity per unit volume of the material constituting the porous body becomes smaller sometimes.

When a substance other than the three substances of α-Al$_2$O$_3$, cordierite and Y$_2$Si$_2$O$_7$ is included in 100 mass % of the material constituting the porous body, a mass ratio of the substance is preferably from 0 to 5.0 mass %. When a lot of such a substance is included, the heat capacity per unit volume of the material constituting the porous body becomes smaller or the thermal expansion coefficient becomes larger sometimes. Examples of the other substance to be included in the material constituting the porous body include MgAl$_2$O$_4$ and mullite.

The mass ratios of α-Al$_2$O$_3$, cordierite, Y$_2$Si$_2$O$_7$ and the like included in the material constituting the porous body can quantitatively be determined by an internal standard method of the X-ray diffraction (XRD). The "internal standard method of the X-ray diffraction (XRD)" is a method in which an internal standard substance and a sample are mixed at a predetermined ratio, and a calibration curve is prepared by using a standard sample having a known concentration and analyzed by utilizing the fact that a linear relation can be obtained between a substance concentration and a diffraction intensity ratio.

A true density of the material constituting the porous body is preferably from 3.30 to 3.70 g/cm$^3$ and further preferably from 3.40 to 3.60 g/cm$^3$. When the true density of the material constituting the porous body is smaller than 3.30 g/cm$^3$, the heat capacity is excessively small sometimes, and when the true density is in excess of 3.70 g/cm$^3$, the strength disadvantageously excessively lowers or the average thermal expansion coefficient disadvantageously excessively enlarges sometimes. The true density of the material constituting the porous body can be measured in conformity with JIS R 1634 by Archimedes method.

The heat capacity per unit volume of the material constituting the porous body at 600° C. is preferably from 4.00 to 4.40 J/K/cm$^3$, further preferably from 4.10 to 4.40 J/K/cm$^3$, and especially preferably from 4.10 to 4.30 J/K/cm$^3$. According to such a constitution, the heat capacity per unit volume of the material constituting the porous body is higher as compared with a material of partition walls for use in the heretofore known plugged honeycomb structure. When the heat capacity per unit volume of the material constituting the porous body is heightened, it is possible to produce a remarkable effect that the plugged honeycomb structure can inhibit the temperature rise during the use at high temperatures and is excellent in thermal shock resistance. When the heat capacity per unit volume of the material constituting the porous body at 600° C. is smaller than 4.00 J/K/cm$^3$, an effect of inhibiting the temperature rise is not sufficiently developed sometimes.

Here, the "heat capacity per unit volume of the material" means a heat capacity measured in a dense material in which any pores or the like are not formed. For example, in the porous body, the pores formed in the porous body are not taken into consideration, and hence the heat capacity is a heat capacity of the material itself constituting the porous body. Hereinafter, in the present description, the heat capacity in which the pores formed in the porous body are taken into consideration will be described as the "heat capacity per unit volume of the porous body", and distinguished from the abovementioned "heat capacity per unit volume of the material". The "heat capacity per unit volume of the material" is referred to simply as the "heat capacity of the material" sometimes. The "heat capacity per unit volume of the porous body" is referred to simply as the "heat capacity of the porous body" sometimes. In the present description, the "heat capacity" is a heat capacity at 600° C. unless otherwise specifically noted. In the present description, a value of each of the "heat capacity" and the "heat capacity per unit volume" is indicated as the heat capacity (J/K/cm$^3$) per 1 cm$^3$ unless otherwise specifically noted.

The heat capacity of the material constituting the porous body at 600° C. can be obtained by the following method. First, a heat capacity (J/K/g) per unit mass of the material constituting the porous body at 600° C. is measured by using an adiabatic type specific heat measurement system manufactured by ULVAC-RICO, Inc. The obtained heat capacity (J/K/g) per unit mass is multiplied by a true density (g/cm$^3$) of the material constituting the porous body which is measured at room temperature by the Archimedes method, to calculate the heat capacity (J/K/cm$^3$) per unit volume of the material constituting the porous body. To measure the heat capacity, a sample having a predetermined size is cut out from the porous body constituting the partition walls so that the heat capacity can be measured by using the sample.

The average thermal expansion coefficient of the porous body at 40 to 800° C. is preferably from 3.0 to 6.0 ppm/K, further preferably from 3.0 to 5.0 ppm/K, and especially preferably from 3.5 to 5.0 ppm/K. When the average thermal expansion coefficient of the porous body at 40 to 800° C. is in the above numeric range, the plugged honeycomb structure becomes excellent in thermal shock resistance. When the average thermal expansion coefficient is smaller than 3.0 ppm/K, the heat capacity unfavorably becomes excessively small sometimes. When the average thermal expansion coefficient is in excess of 6.0 ppm/K, the thermal shock resistance unfavorably excessively lowers. The average thermal expansion coefficient can be measured by using a differential detection type of thermal dilatometer.

The porous body preferably satisfies a relation of the following equation (3):

$$C - 0.007 \times \alpha^2 \geq 3.95 \tag{3}$$

in which C is the heat capacity (J/K/cm$^3$) of the material constituting the porous body at 600° C. and α is the average thermal expansion coefficient (ppm/K) of the porous body at 40 to 800° C.

When the porous body satisfies the relation of the above equation (3), in the plugged honeycomb structure of the present embodiment, both the heat capacity (J/K/cm$^3$) of the material constituting the porous body at 600° C. and the average thermal expansion coefficient (ppm/K) of the porous body at 40 to 800° C. have suitable values. That is, the heat capacity (J/K/cm$^3$) is a parameter effective for the inhibition of the temperature rise of the plugged honeycomb structure, and the average thermal expansion coefficient (ppm/K) is a parameter effective for the improvement of the thermal shock resistance of the plugged honeycomb structure. Furthermore, when the porous body satisfies the relation of the above equation (3), a balance between the inhibiting effect of the temperature rise and the improving effect of the thermal shock resistance can be achieved.

A porosity of the porous body is preferably from 20 to 50%, further preferably from 20 to 45%, and especially preferably from 25 to 45%. When the porosity of the porous body is smaller than 20%, a pressure loss of the plugged honeycomb structure enlarges sometimes. When the porosity of the porous body is in excess of 50%, the partition walls of the plugged honeycomb structure become brittle and easily lacks sometimes. Furthermore, when the porosity of the porous body is excessively high, the heat capacity of the porous body becomes smaller, and hence the temperature of the plugged honeycomb structure easily rises. The porosity of the porous body is the porosity of the partition walls of the plugged honeycomb structure. The porosity of the porous body can be measured in conformity with JIS R 1634 by the Archimedes method.

An average pore diameter of the porous body is preferably from 5 to 20 μm, further preferably from 8 to 15 μm, and especially preferably from 8 to 12 μm. When the average pore diameter of the porous body is smaller than 5 μm, the pressure loss of the plugged honeycomb structure enlarges sometimes. When the average pore diameter of the porous body is in excess of 20 μm and when the plugged honeycomb structure is used as a filter such as the DPF, a part of PM in the exhaust gas passes through the partition walls and hence a trapping efficiency of the filter deteriorates sometimes. The average pore diameter of the porous body can be measured in conformity with JIS R 1655 by mercury porosimetry.

Figure 7:
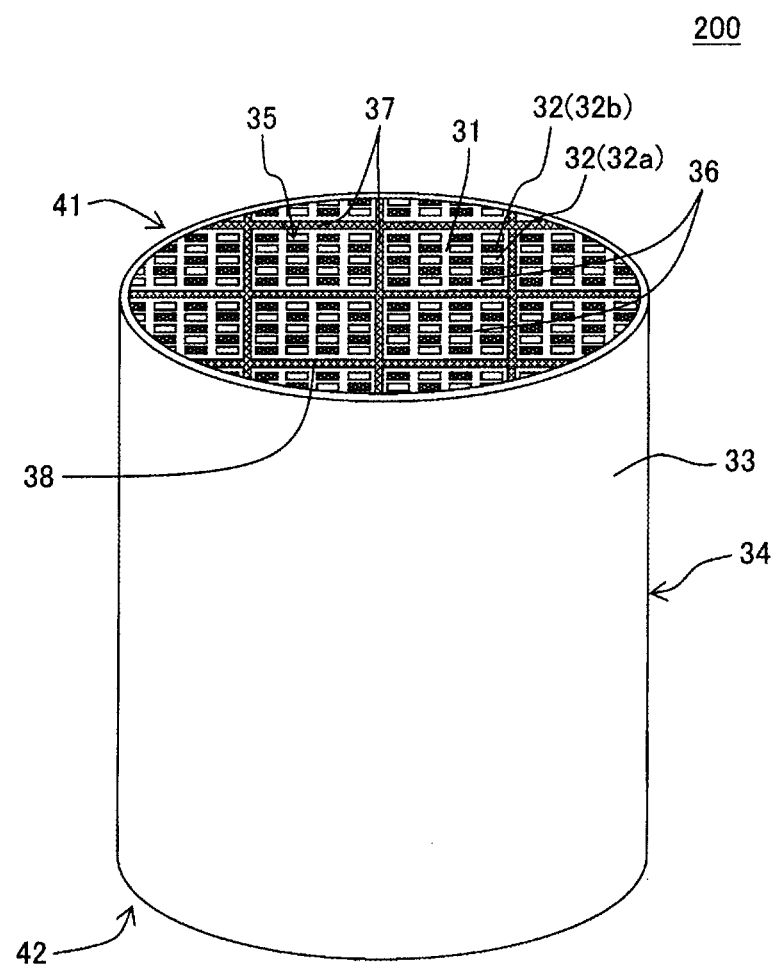
FIG. 7 is a schematic perspective view of another embodiment of the plugged honeycomb structure of the present invention seen from an inflow end face side.

In addition, the honeycomb structure body of the plugged honeycomb structure may be a segmented structure which has a plurality of pillar-shaped honeycomb segments having the partition walls and in which the plurality of honeycomb segments are bonded in a state where the honeycomb segments are disposed adjacent to one another so that side surfaces of the honeycomb segments face one another. An example of the plugged honeycomb structure including the honeycomb structure body of the segmented structure is such a plugged honeycomb structure 200 as shown in FIG. 7. The plugged honeycomb structure 200 shown in FIG. 7 includes a honeycomb structure body 34 in which a plurality of honeycomb segments 36 are bonded by a bonding layer 37 in a state where the honeycomb segments are disposed adjacent to one another so that side surfaces of the honeycomb segments face one another. Each of the honeycomb segments 36 has porous partition walls 31 defining a plurality of cells 32 (cells 32a and cells 32b) which extend from a first end face 41 to a second end face 42 and become through channels for a fluid, and outer walls 38 disposed to surround the partition walls 31. By the bonding layer 37, the outer walls 38 of the honeycomb segments 36 disposed adjacent to one another are bonded to one another. The bonding layer 37 may have a function of a buffer material to buffer a heat stress generated in the honeycomb structure body 34. In the plugged honeycomb structure 200 shown in FIG. 7, a circumferential wall 33 is disposed at an outermost circumference of a bonded body in which the plurality of honeycomb segments 36 are bonded.

In the honeycomb structure body of the segmented structure, the partition walls of at least one of the plurality of honeycomb segments are preferably constituted of a porous body including α-$Al_2O_3$ as a main phase and further including cordierite and $Y_2Si_2O_7$. In the honeycomb structure body of the segmented structure, the partition walls of all the honeycomb segments may be constituted of the porous body including α-$Al_2O_3$ as the main phase and further including cordierite and $Y_2Si_2O_7$. As to the bonding layer, a bonding layer having a constitution similar to a bonding layer in a honeycomb structure body of a heretofore known segmented structure is usable.

The plugged honeycomb structure 200 shown in FIG. 7 may be prepared by obtaining the bonded body in which the plurality of honeycomb segments 36 are bonded and processing a circumferential portion of the obtained bonded body by grinding or the like. The circumferential portion of the bonded body is processed, so that a shape of a cross section of the bonded body which is perpendicular to an extending direction of the cells 32 can be a desirable shape such as a circular shape. The circumferential portion of the bonded body is processed, and then the circumferential wall 33 may be disposed by applying a ceramic material to the outermost circumference. FIG. 7 is a schematic perspective view of another embodiment of the plugged honeycomb structure of the present invention seen from an inflow end face side. In FIG. 7, a reference numeral 35 is a "plugging portion" disposed in an open end of the cell 32. Even in such a plugged honeycomb structure of the so-called segmented structure, an operation effect similar to that of a so-called monolithic plugged honeycomb structure shown in FIG. 1 to FIG. 5 can be obtained.

There is not any special restriction on a thickness of the partition walls of the honeycomb structure body, but the thickness is preferably from 100 to 500 μm, further preferably from 150 to 400 μm, and especially preferably from 150 to 300 μm. When the thickness of the partition walls is in such a range, a rise of the pressure loss can be inhibited while keeping the strength of the partition walls of the plugged honeycomb structure.

There is not any special restriction on a cell density of the honeycomb structure body, but the cell density is preferably from 15 to 100 cells/cm$^2$, further preferably from 30 to 65 cells/cm$^2$, and especially preferably from 30 to 50 cells/cm$^2$. When the cell density is in such a range and when the plugged honeycomb structure is used in the DPF or the like, the trapping efficiency can be improved while inhibiting the pressure loss.

There is not any special restriction on a shape of each cell formed in the honeycomb structure body. Here, the "cell shape" is a shape of the cells in a cross section of the honeycomb structure body which is perpendicular to the cell extending direction. Examples of the cell shape include a quadrangular shape, a hexagonal shape, an octagonal shape, and any combination of these shapes.

There is not any special restriction on a shape of the honeycomb structure body, and examples of the shape include a pillar shape (a columnar shape) in which a bottom surface is circular, a pillar shape in which a bottom surface is oval, and a pillar shape in which a bottom surface has a polygonal shape (a quadrangular shape, a pentangular shape, a hexagonal shape, a heptagonal shape, an octagonal shape or the like).

A length of the honeycomb structure body from the first end face to the second end face and a size of the cross section of the honeycomb structure body which is perpendicular to the cell extending direction may suitably be selected so that an optimum purification performance can be obtained when the plugged honeycomb structure of the present embodiment is used as an exhaust gas purifying filter. For example, the length of the honeycomb structure body from the first end face to the second end face is preferably from 100 to 500 mm and further preferably from 100 to 300 mm. An area of the cross section of the honeycomb structure body which is perpendicular to the cell extending direction is preferably from 7000 to 70000 mm$^2$ and further preferably from 7000 to 30000 mm$^2$.

An exhaust gas purifying catalyst may be loaded onto at least one of each surface of the partition walls of the honeycomb structure body and each pore of the partition walls. An example of the catalyst is a platinum group metal loaded onto porous $\gamma$-$Al_2O_3$. It is to be noted that the catalyst loaded onto the partition walls of the honeycomb structure body is a constitutional element different from the partition walls (i.e., the porous body), and hence the hitherto described "material constituting the porous body" does not include this catalyst.

Next, a manufacturing method of the plugged honeycomb structure of the present embodiment will be described. When the plugged honeycomb structure is manufactured, there is first prepared a forming raw material to prepare the porous body including $\alpha$-$Al_2O_3$, as the main phase and further including cordierite and $Y_2Si_2O_7$. There is not any special restriction on the forming raw material, as long as a fired body (the porous body) obtained by firing the forming raw material can include the above three substances. For example, as the forming raw material, powder obtained by mixing $Al_2O_3$, kaolin, talc, cordierite, $SiO_2$, $Y_2O_3$ and the like is usable. Additionally, a dispersing medium or an additive may further be added to the forming raw material including the abovementioned raw materials.

An average particle diameter of powder of $Al_2O_3$ (hereinafter also referred to as the "$Al_2O_3$ powder") for use in the forming raw material is preferably from 20 to 60 μm, further preferably from 20 to 50 and especially preferably from 30 to 50 μm. When the average particle diameter of the $Al_2O_3$ powder is excessively large, it is difficult to extrude a kneaded material prepared from the forming raw material sometimes. On the other hand, when the average particle diameter of the $Al_2O_3$ powder is excessively small, an initial pressure loss of the plugged honeycomb structure to be obtained becomes excessively large sometimes. When the partition walls are constituted of the porous body having the aggregates and the bonding material, for example, the $Al_2O_3$ powder for use in the forming raw material constitutes the aggregates of the porous body.

An average particle diameter of another raw material powder for use in the forming raw material is preferably from 0.01 to 20 μm, further preferably from 0.01 to 15 μm, and especially preferably from 0.01 to 10 μm. When the average particle diameter of the other raw material powder is excessively large, the mechanical strength of the plugged honeycomb structure to be obtained becomes insufficient sometimes. The other raw material may be dissolved in a dispersing medium such as water.

Examples of the additive include a binder and a pore former. An example of the dispersing medium is water.

Examples of the binder include methylcellulose, hydroxypropoxyl cellulose, hydroxyethyl cellulose, carboxymethylcellulose, and polyvinyl alcohol. There is not any special restriction on the pore former, as long as the pore former becomes pores after fired, and examples of the pore former include starch, a foamable resin, a water absorbable resin, and silica gel.

Particle diameters of the raw material powder and an amount of the powder to be blended as well as particle diameters of powder of the pore former to be added and an amount of the powder to be blended are regulated, so that the porous body having desirable porosity and an average pore diameter can be obtained.

Next, the obtained forming raw material is kneaded to form a kneaded material. There is not any special restriction on a method of forming the kneaded material, and an example of the method is a method in which a kneader, a vacuum pugmill or the like is used.

Next, the obtained kneaded material is extruded to prepare a honeycomb formed body. The extrusion can be performed by using a die having a desirable cell shape, partition wall thickness and cell density. Next, the obtained honeycomb formed body may be dried to obtain a honeycomb dried body prepared by drying the honeycomb formed body. There is not any special restriction on a drying method, and examples of the method include hot air drying, microwave drying, dielectric drying, reduced-pressure drying, vacuum drying, and freeze drying. Among these methods, the dielectric drying, the microwave drying or the hot air drying is preferably performed alone or any combination thereof is preferably performed. Furthermore, as drying conditions, a drying temperature is preferably set to 30 to 150° C. and a drying time is preferably set to one minute to two hours.

Next, open ends of cells of the obtained honeycomb formed body or the honeycomb dried body obtained by drying the honeycomb formed body are plugged by a plugging material. An example of a method of plugging the open ends of the cells is a method in which the plugging material is charged into the open ends of the cells. The method of charging the plugging material can be performed in conformity with a heretofore known manufacturing method of the plugged honeycomb structure. As a ceramic raw material to form the plugging material, a ceramic raw material for use in the heretofore known manufacturing method of the plugged honeycomb structure is usable, but the same ceramic raw material as in the honeycomb formed body (or the honeycomb dried body) is preferably used. It is to be noted that for the purpose of adjusting a porosity, pore diameters and the like of plugging portions formed by using the plugging material, there may suitably be changed particle diameters of ceramic raw material powder and an amount of the powder to be blended as well as particle diameters of pore former powder to be added and an amount of the powder to be blended.

Next, the honeycomb formed body (or the honeycomb dried body) in which the plugging material is charged into the open ends of the cells is fired. The obtained honeycomb fired body becomes the plugged honeycomb structure of the present embodiment. A firing temperature is preferably from 1200 to 1400° C. and further preferably from 1250 to 1350° C. Furthermore, a firing time is preferably from about one to ten hours. The firing can be performed in, for example, an air atmosphere, a steam atmosphere, or a hydrocarbon gas combustion atmosphere.

Prior to forming the plugging portions in the honeycomb formed body, the honeycomb formed body may be fired to obtain the honeycomb fired body, and the plugging portions may be formed in open ends of cells of the obtained honeycomb fired body, further followed by the firing, so that the plugged honeycomb structure can be obtained. As described above, the plugged honeycomb structure of the present embodiment can be manufactured.

EXAMPLES

Hereinafter, the present invention will further specifically be described in accordance with examples, but the present invention is not limited to these examples.

Example 1

In Example 1, first, a forming raw material was prepared by using $\alpha$-$Al_2O_3$ powder, cordierite powder, and $Y_2O_3$ powder. An amount of the used $\alpha$-$Al_2O_3$ powder was 3500 g, an amount of the used cordierite powder was 1500 g, and an amount of the used $Y_2O_3$ powder was 100 g. Table 1 shows a formulation (unit: g) of the forming raw material of Example 1. An average particle diameter of the $\alpha$-$Al_2O_3$ powder was 32 μm, an average particle diameter of the cordierite powder was 2 μm, and an average particle diameter of the $Y_2O_3$ powder was 0.1 μm. In Example 1, 350 g of starch as a pore former, 200 g of methylcellulose as a binder and an appropriate amount of water were added to raw materials shown in the formula of Table 1.

TABLE 1

| | $\alpha$-$Al_2O_3$ (g) | Cordierite (g) | Kaolin (g) | Talc (g) | $Y_2O_3$ (g) |
|---|---|---|---|---|---|
| Example 1 | 3500 | 1500 | — | — | 100 |
| Example 2 | 3500 | — | 1365 | 660 | 30 |
| Example 3 | 3000 | 2000 | — | — | 140 |
| Example 4 | 4000 | 1000 | — | — | 70 |
| Example 5 | 3500 | 1500 | — | — | 200 |
| Example 6 | 3500 | 1500 | — | — | 100 |

Next, the obtained forming raw material was kneaded with a kneader and then kneaded with a vacuum pugmill to form a kneaded material. Next, the obtained kneaded material was extruded to prepare a honeycomb formed body. As to the honeycomb formed body after fired, a partition wall thickness became 300 μm and a cell density became 46.5 cells/cm². A cell shape of the honeycomb formed body became square after fired. Next, the honeycomb formed body was dried to obtain a honeycomb dried body. As to the drying, microwave drying was first performed and then hot air drying was performed. Next, plugging portions were disposed in open ends of cells of the obtained honeycomb dried body. Next, the obtained honeycomb dried body was degreased. The degreasing was performed at 450° C. in the air atmosphere for five hours. Next, the degreased honeycomb dried body was fired to obtain a plugged honeycomb structure. The firing was performed at 1300° C. in the air atmosphere for four hours.

A composition of partition walls (a porous body) constituting the plugged honeycomb structure of Example 1 was measured by X-ray diffraction (XRD). As a result, the partition walls constituting the plugged honeycomb structure of Example 1 was constituted of a porous body including $\alpha$-$Al_2O_3$ as a main phase and further including cordierite and $Y_2Si_2O_7$. Table 2 shows the measurement results by the X-ray diffraction (XRD). More specifically, the porous body constituting the partition walls included $\alpha$-$Al_2O_3$, cordierite, and $Y_2Si_2O_7$. A mass ratio of $\alpha$-$Al_2O_3$ in the porous body was 70.8 mass %. A mass ratio of cordierite in the porous body was 28.3 mass %. A mass ratio of $Y_2Si_2O_7$ in the porous body was 0.9 mass %. Table 2 shows the mass ratios (mass %) of $\alpha$-$Al_2O_3$, cordierite, and $Y_2Si_2O_7$ in the porous body. Additionally, the partition walls of the plugged honeycomb structure of Example 1 were constituted of the porous body having aggregates and a bonding material to bond the aggregates to one another in a case where pores were formed among the aggregates.

TABLE 2

| | $\alpha$-$Al_2O_3$ (mass %) | Cordierite (mass %) | $Y_2Si_2O_7$ (mass %) |
|---|---|---|---|
| Example 1 | 70.8 | 28.3 | 0.9 |
| Example 2 | 67.3 | 32.4 | 0.3 |
| Example 3 | 62.7 | 36.0 | 1.3 |
| Example 4 | 78.9 | 20.5 | 0.6 |
| Example 5 | 76.1 | 22.1 | 1.8 |
| Example 6 | 70.8 | 28.3 | 0.9 |

As to the partition walls (the porous body) constituting the obtained plugged honeycomb structure, a true density (g/cm³), a heat capacity (J/K/cm³), a thermal expansion coefficient (ppm/K), a porosity (%) and an average pore diameter (μm) were measured by the following method. Table 3 shows the measurement results. Furthermore, a column of "F" of Table 3 shows a value of "C−0.007×α²", in which C is the heat capacity (J/K/cm³) of a material constituting the porous body at 600° C. and α is an average thermal expansion coefficient (ppm/K) of the porous body at 40 to 800° C.

The true density (g/cm³) and the porosity (%) were measured by Archimedes method (JIS R 1634). The true density (g/cm³) is a true density (g/cm³) of the material constituting the porous body. The average pore diameter (μm) was measured by mercury porosimetry (JIS R 1655). The thermal expansion coefficient (ppm/K) was obtained by measuring an average thermal expansion coefficient (ppm/K) of the porous body at 40 to 800° C. with a differential detection type of thermal dilatometer.

The heat capacity (J/K/cm³) was measured by the following method. First, a heat capacity (J/K/g) per unit mass of a material constituting the porous body at 600° C. was measured by using an adiabatic type specific heat measurement system manufactured by ULVAC-RICO, Inc. Next, the obtained heat capacity (J/K/g) per unit mass was multiplied by the true density (g/cm³) of the material constituting the porous body which was measured at room temperature by the Archimedes method, to calculate the heat capacity (J/K/cm³) per unit volume of the material constituting the porous body.

In addition, strength (MPa) of the partition walls (the porous body) constituting the plugged honeycomb structure of Example 1 was measured by the following method. Table 3 shows the measurement results. First, a sample having a predetermined size was cut out from the partition walls of the plugged honeycomb structure and obtained as the sample for the strength measurement. The strength (MPa) was measured in a three-point bending test by using the prepared sample.

TABLE 3

|  | True density (g/cm$^3$) | Heat capacity (J/K/cm$^3$) | Thermal expansion coefficient (ppm/K) | F | Porosity (%) | Ave. pore dia. (μm) | Strength (MPa) |
|---|---|---|---|---|---|---|---|
| Example 1 | 3.50 | 4.18 | 4.13 | 4.06 | 39 | 9 | 26 |
| Example 2 | 3.43 | 4.11 | 3.32 | 4.03 | 43 | 11 | 23 |
| Example 3 | 3.38 | 4.03 | 3.01 | 3.97 | 36 | 11 | 32 |
| Example 4 | 3.62 | 4.33 | 5.28 | 4.13 | 45 | 8 | 16 |
| Example 5 | 3.60 | 4.25 | 5.22 | 4.06 | 35 | 12 | 39 |
| Example 6 | 3.50 | 4.18 | 4.13 | 4.06 | 29 | 8 | 45 |
| Comparative Example 1 | 3.54 | 3.84 | 0.5 | 3.84 | 45 | 9 | 8 |
| Comparative Example 2 | 3.22 | 3.76 | 4.5 | 3.62 | 39 | 9 | 53 |
| Comparative Example 3 | 2.52 | 3.19 | 0.5 | 3.19 | 41 | 12 | 14 |

Examples 2 to 6

The procedures of Example 1 were repeated except that a formula of a forming raw material shown in Table 1 was used, to prepare plugged honeycomb structures. However, in Example 6, an amount of a pore former (starch) to be added to the forming raw material shown in Table 1 was changed from 350 g to 50 g to prepare the forming raw material. As shown in Table 1, in Example 2, kaolin powder and talc powder were used in a forming raw material. An average particle diameter of the kaolin powder was 3 μm, and an average particle diameter of the talc powder was 3 μm. Partition walls of the plugged honeycomb structure of each of Examples 2 to 6 were constituted of a porous body having aggregates and a bonding material to bond the aggregates to one another in a state where pores were formed among the aggregates. A composition of each porous body constituting the partition walls was measured in X-ray diffraction (XRD). Table 2 shows the measurement results.

As to the partition walls (the porous body) constituting the plugged honeycomb structure of each of Examples 2 to 6, the procedures of Example 1 were repeated to measure a true density (g/cm$^3$), a heat capacity (J/K/cm$^3$), a thermal expansion coefficient (ppm/K), a porosity (%), and an average pore diameter (μm). Table 3 shows the measurement results. In addition, a column of "F" of Table 3 shows a value of "C−0.007×α$^2$". Additionally, the procedures of Example 1 were repeated to measure strength (MPa) of the partition walls (the porous body) constituting the plugged honeycomb structure of each of Examples 2 to 6. Table 3 shows the measurement results.

Comparative Example 1

In Comparative Example 1, first, a forming raw material was prepared by using α-Al$_2$O$_3$ powder, TiO$_2$ powder, talc powder, and mica powder. An amount of the α-Al$_2$O$_3$ powder to be used was 2550 g, an amount of the TiO$_2$ powder to be used was 1950 g, an amount of the talc powder to be used was 350 g, and an amount of the mica powder to be used was 150 g. An average particle diameter of the α-Al$_2$O$_3$ powder was 32 μm, an average particle diameter of the TiO$_2$ powder was 0.4 μm, an average particle diameter of the talc powder was 3 μm, and an average particle diameter of the mica powder was 42 μm. In Comparative Example 1, 50 g of starch as a pore former, 200 g of methylcellulose as a binder and an appropriate amount of water were added to the abovementioned raw materials. The procedures of Example 1 were repeated except that the forming raw material prepared as described above was used and except that a honeycomb dried body was fired at 1500° C. in the air atmosphere for four hours, to prepare a plugged honeycomb structure.

Comparative Example 2

In Comparative Example 2, first, a forming raw material was prepared by using 3000 g of α-SiC powder having an average particle diameter of 12 μm and 2000 g of α-SiC powder having an average particle diameter of 2 μm and adding 300 g of methylcellulose as a binder and an appropriate amount of water. The procedures of Example 1 were repeated except that the forming raw material prepared as described above was used and except that a honeycomb dried body was fired at 2200° C. in an argon atmosphere for two hours, to prepare a plugged honeycomb structure.

Comparative Example 3

In Comparative Example 3, first, a forming raw material was prepared by using 1110 g of kaolin powder, 2135 g of talc powder, 1210 g of alumina powder and 540 g of silica powder and adding 50 g of a pore former, 200 g of methylcellulose as a binder and water. An average particle diameter of the kaolin powder was 3 μm, an average particle diameter of the talc powder was 24 μm, an average particle diameter of the alumina powder was 6 μm, and an average particle diameter of the silica powder was 21 μm. The procedures of Example 1 were repeated except that the forming raw material prepared as described above was used and except that a honeycomb dried body was fired at 1420° C. in the air atmosphere for four hours, to prepare a plugged honeycomb structure.

As to partition walls (a porous body) constituting the plugged honeycomb structure of each of Comparative Examples 1 to 3, the procedures of Example 1 were repeated to measure a true density (g/cm$^3$), a heat capacity (J/K/cm$^3$), a thermal expansion coefficient (ppm/K), a porosity (%), and an average pore diameter (μm). Table 3 shows the measurement results. In addition, a column of "F" of Table 3 shows a value of "C−0.007×α$^2$". In addition, the procedures of Example 1 were repeated to measure a strength (MPa) of the partition walls (the porous body) constituting the plugged honeycomb structure of each of Comparative Examples 1 to 3. Table 3 shows the measurement values.

(Results)

A plugged honeycomb structure of Comparative Example 1 had a lot of microcracks and hence the structure had a low strength. Each of plugged honeycomb structures of Comparative Examples 2 and 3 had a small heat capacity. In all plugged honeycomb structures of Examples 1 to 6, generation of the microcracks was inhibited as compared with the plugged honeycomb structure of Comparative Example 1. Furthermore, all the plugged honeycomb structures of Examples 1 to 6 had higher strength than the plugged honeycomb structure of Comparative Example 1. Additionally, all the plugged honeycomb structures of Examples 1 to 6 had a higher heat capacity than Comparative Examples 1 to 3. Here, the heat capacity is a parameter effective for inhibition of a temperature rise of the plugged honeycomb structure and a thermal expansion coefficient is a parameter effective for improvement of a thermal shock resistance of the plugged honeycomb structure. Therefore, it is seen that in the plugged honeycomb structures of Examples 1 to 6, a balance between the inhibiting effect of the temperature rise and the improving effect of the thermal shock resistance is suitably achieved, as compared with the plugged honeycomb structures of Comparative Examples 1 to 3. As to values of "F" shown in Table 3, the values of Examples 1 to 6 and Comparative Examples 1 to 3 were compared, and in each of the plugged honeycomb structures of Examples 1 to 6, the value of "F" was 3.95 or more. Therefore, it can be considered that when the value of "F" is 3.95 or more, the balance between the inhibiting effect of the temperature rise and the improving effect of the thermal shock resistance in the plugged honeycomb structure can be achieved.

A plugged honeycomb structure of the present invention can be utilized as an exhaust gas purifying filter to purify an exhaust gas.

DESCRIPTION OF REFERENCE SYMBOLS AND REFERENCE NUMERALS 1 and 31: partition wall, 2 and 32: cell, 2a and 32a: cell, 2b and 32b: cell, 3 and 33: circumferential wall, 4 and 34: honeycomb structure body, 5 and 35: plugging portion, 7: aggregates, 8: bonding material, 8a: cordierite, 8b: $Y_2Si_2O_7$, 9: pore, 10: porous body, 11 and 41: first end face (end face), 12 and 42: second end face (end face), 36: honeycomb segment, 37: bonding layer, 38: outer wall (the outer wall of the honeycomb segment), and 100 and 200: plugged honeycomb structure.

What is claimed is:

1. A plugged honeycomb structure comprising:
    a pillar-shaped honeycomb structure body having porous partition walls defining a plurality of cells which become through channels for a fluid and extend from a first end face to a second end face; and
    plugging portions disposed in open ends of the predetermined cells in the first end face and open ends of the residual cells in the second end face,
    wherein the partition walls are constituted of a porous body including $\alpha$-$Al_2O_3$ as a main phase and further including cordierite and $Y_2Si_2O_7$, and
    wherein a mass ratio of $\alpha$-$Al_2O_3$ to 100 mass % of a material constituting the porous body is from 60 to 80 mass %.

2. The plugged honeycomb structure according to claim 1, wherein a mass ratio of cordierite to 100 mass % of the material constituting the porous body is from 20 to 40 mass %.

3. The plugged honeycomb structure according to claim 1, wherein a mass ratio of $Y_2Si_2O_7$ to 100 mass % of the material constituting the porous body is from 0.1 to 5.0 mass %.

4. The plugged honeycomb structure according to claim 1, wherein a heat capacity of the material constituting the porous body at 600° C. is from 4.00 to 4.40 $J/K/cm^3$.

5. The plugged honeycomb structure according to claim 1, wherein an average thermal expansion coefficient of the porous body at 40 to 800° C. is from 3.0 to 6.0 ppm/K.

6. The plugged honeycomb structure according to claim 1, wherein the porous body satisfies a relation of the following equation (1):

$$C - 0.007 \times \alpha^2 \geq 3.95 \quad (1),$$

in which C is a heat capacity ($J/K/cm^3$) of the material constituting the porous body at 600° C. and $\alpha$ is an average thermal expansion coefficient (ppm/K) of the porous body at 40 to 800° C.

7. The plugged honeycomb structure according to claim 1, wherein a porosity of the porous body is from 20 to 50%.

8. The plugged honeycomb structure according to claim 1, wherein an average pore diameter of the porous body is from 5 to 20 μm.

9. The plugged honeycomb structure according to claim 1, wherein the honeycomb structure body is a segmented structure which has a plurality of pillar-shaped honeycomb segments having the partition walls and in which the plurality of honeycomb segments are bonded in a state where the honeycomb segments are disposed adjacent to one another so that side surfaces of the honeycomb segments face one another.

10. The plugged honeycomb structure according to claim 1, wherein an exhaust gas purifying catalyst is loaded onto at least one of each surface of the partition walls of the honeycomb structure body and each pore of the partition walls.

11. The plugged honeycomb structure according to claim 1, wherein a mass ratio of cordierite to 100 mass % of the material constituting the porous body is from 20 to 40 mass %; and
    wherein a mass ratio of $Y_2Si_2O_7$ to 100 mass % of the material constituting the porous body is from 0.1 to 5.0 mass %.

12. The plugged honeycomb structure according to claim 4, wherein an average thermal expansion coefficient of the porous body at 40 to 800° C. is from 3.0 to 6.0 ppm/K; and
    wherein the porous body satisfies a relation of the following equation (1):

$$C - 0.007 \times \alpha^2 \geq 3.95 \quad (1),$$

in which C is a heat capacity ($J/K/cm^3$) of the material constituting the porous body at 600° C. and $\alpha$ is an average thermal expansion coefficient (ppm/K) of the porous body at 40 to 800° C.

* * * * *